United States Patent
Nakashika (10) Patent No.: US 7,356,661 B2
(45) Date of Patent: Apr. 8, 2008

(54) CONTROL OF INFORMATION REPRODUCTION AND DELETION IN A LIBRARY APPARATUS

(75) Inventor: Masahiro Nakashika, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 377 days.

(21) Appl. No.: 10/669,797

(22) Filed: Sep. 25, 2003

(65) Prior Publication Data

US 2004/0064630 A1    Apr. 1, 2004

(30) Foreign Application Priority Data

Oct. 1, 2002    (JP) .............................. 2002-288911

(51) Int. Cl.
   *G06F 12/00*    (2006.01)
(52) U.S. Cl. ...................... 711/166; 711/161; 711/159; 365/218; 710/13
(58) Field of Classification Search ...................... None
   See application file for complete search history.

(56) References Cited

U.S. PATENT DOCUMENTS

2002/0172496 A1* 11/2002 Gunji et al. .................. 386/46
2002/0180803 A1* 12/2002 Kaplan et al. ............... 345/810
2002/0194309 A1* 12/2002 Carter et al. ................ 709/219

FOREIGN PATENT DOCUMENTS

| JP | 11-088816 | | 3/1999 |
|---|---|---|---|
| JP | 2000311469 | * | 7/2000 |
| JP | 2000-311469 | | 11/2000 |
| JP | 2001-006254 | | 1/2001 |
| JP | 2002-150754 | | 5/2002 |

OTHER PUBLICATIONS

Wipe-O-Mat 1.0 Manual, Mar. 2002, http://www.soft-o-mat.tk.*

* cited by examiner

*Primary Examiner*—B. James Peikari
(74) *Attorney, Agent, or Firm*—Pillsbury Winthrop Shaw Pittman, LLP (57) ABSTRACT

An information recording/reproduction apparatus according to one aspect of this invention includes a first recording/reproduction unit configured to execute recording, reproduction, and deletion of information for a built-in first recording medium, a second recording/reproduction unit configured to execute recording and reproduction of information for a detachable second recording medium, a recording control unit configured to control to record a library information file, that contains a plurality of pieces of library information corresponding to a plurality of contents information recorded on the first and second recording media, on the first recording medium, and a deletion control unit configured to execute a process for deleting all pieces of library information contained in the library information file, and a process for deleting all pieces of contents information recorded on the first recording medium.

2 Claims, 6 Drawing Sheets

FIG. 1

(Library title information file)

| | Number of libraries=NL |
|---|---|
| #1 | Creation date & time<br>Video recording date & time<br>Video recording day of the week<br>Channel<br>Genre<br>Title name<br>Image quality mode<br>Bit rate<br>Audio quality<br>Disk identification number<br>Display disk number<br>Title identification number |
| #2 | (Ditto) |
| #3 | (Ditto) |
| #4 | (Ditto) |
| #5 | (Ditto) |
| ~ | ~ |
| #NL | (Ditto) |

FIG. 2

(Disk management information file)

| | Number of managed disks=ND |
|---|---|
| #1 | Disk identification number<br>Display disk number<br>Disk name<br>Disk remaining capacity information |
| #2 | (Ditto) |
| #3 | (Ditto) |
| #4 | (Ditto) |
| #5 | (Ditto) |
| ~ | ~ |
| #ND | (Ditto) |

FIG. 3

Library title list (all titles) 1/3 pages

| Number | Year/month/day | Day of the week | Hour : minute | CH | Genre | Title name |
|---|---|---|---|---|---|---|
| 131B | 2001/5/13 | Sun | AM11:00 | 4 | News | OOOO△△△△ |
| HDD | 2001/5/9 | Wed | PM7:00 | BS15 | Sports | OOOOXXXX |
| 004A | 2001/5/6 | Sun | PM9:00 | 6 | Drama | OOOOO△△6 |
| 004A | 2001/4/29 | Sun | PM9:00 | 6 | Drama | OOOOO△△5 |
| 012B | 2001/4/24 | Tue | PM9:54 | 10 | News | OOOO△△XX |
| 051 | 2001/4/22 | Sun | PM9:00 | 6 | Drama | OOOOO△△4 |
| HDD | 2001/4/18 | Wed | PM7:00 | 10 | Movie | OO△△△△XX |
| 001 | 2001/4/15 | Sun | PM9:00 | 6 | Drama | OOOOO△△3 |
| HDD | 2001/4/15 | Sun | PM6:30 | 8 | Anime | OOOO△△△X |

CONTROL OF INFORMATION REPRODUCTION AND DELETION IN A LIBRARY APPARATUS

CROSS-REFERENCE TO RELATED APPLICATIONS

This application is based upon and claims the benefit of priority from the prior Japanese Patent Application No. 2002-288911, filed Oct. 1, 2002, the entire contents of which are incorporated herein by reference.

BACKGROUND OF THE INVENTION

1. Field of the Invention

The present invention relates to an information recording/reproduction apparatus for recording information such as moving image data, still image data, audio data, and the like on recording media such as a hard disk, optical disk, and the like, and reproducing information recorded on these recording media.

2. Description of the Related Art

As an apparatus for recording/reproducing information such as moving image data, still image data, audio data, and the like, an image recording/reproduction apparatus that handles detachable recording media such as optical disks represented by a DVD-RAM has been developed. Recently, a hard-disk built-in type image recording/reproduction apparatus which can simultaneously handle detachable recording media such as optical disks and the like, and a recording medium incorporated in the apparatus has been developed.

Such hard-disk built-in type image recording/reproduction apparatus can record a large number of programs as the capacities of optical disks and hard disks increase. As a result, the user often forgets correspondence between disks and their contents. Although management information is written on each disk, the contents of that disk cannot be recognized unless the disk is loaded. Hence, what kinds of images are recorded cannot be managed by only a user's memory.

A library function suited to such hard-disk built-in type image recording/reproduction apparatus is described in Jpn. Pat. Appln. KOKAI Publication No. 2002-150754. The library function allows the user to easily identify and manage many images held on a plurality of optical disks and hard disk together. More specifically, upon recording an image on an optical disk or hard disk, library information of the image to be recorded is generated, and is stored in the hard disk. The library information can be edited and displayed as a list as needed. In this way, even when no disk is loaded, the user can easily display a list of disks and programs recorded on them.

The library function is very effective, but the library information often requires a huge volume. The user often wants to re-organize library information. However, there is no means suitable for organizing such library information. In order to organize library information, the user must initialize the hard disk as well as library information, or must manually register or delete library information for each disk or program, resulting in poor degree of freedom and very troublesome operations.

BRIEF SUMMARY OF THE INVENTION

An information recording/reproduction apparatus according to one aspect of the present invention comprises a first recording/reproduction unit configured to record information on a built-in first information recording medium, reproduce information recorded on the first information recording medium, and delete information recorded on the first information recording medium, a second recording/reproduction unit configured to record information on a detachable second information recording medium, and reproduce information recorded on the second information recording medium, a recording control unit configured to control the first recording/reproduction unit to record a library information file, which contains a plurality of pieces of library information corresponding to a plurality of pieces of contents information recorded on the first and second information recording media, on the first information recording medium, and a deletion control unit configured to control the first recording/reproduction unit to execute a process for deleting all pieces of library information contained in the library information file recorded on the first information recording medium, and a process for deleting all pieces of contents information recorded on the first information recording medium.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment of the present invention will be described hereinafter with reference to the accompanying drawings.

Figure 1:
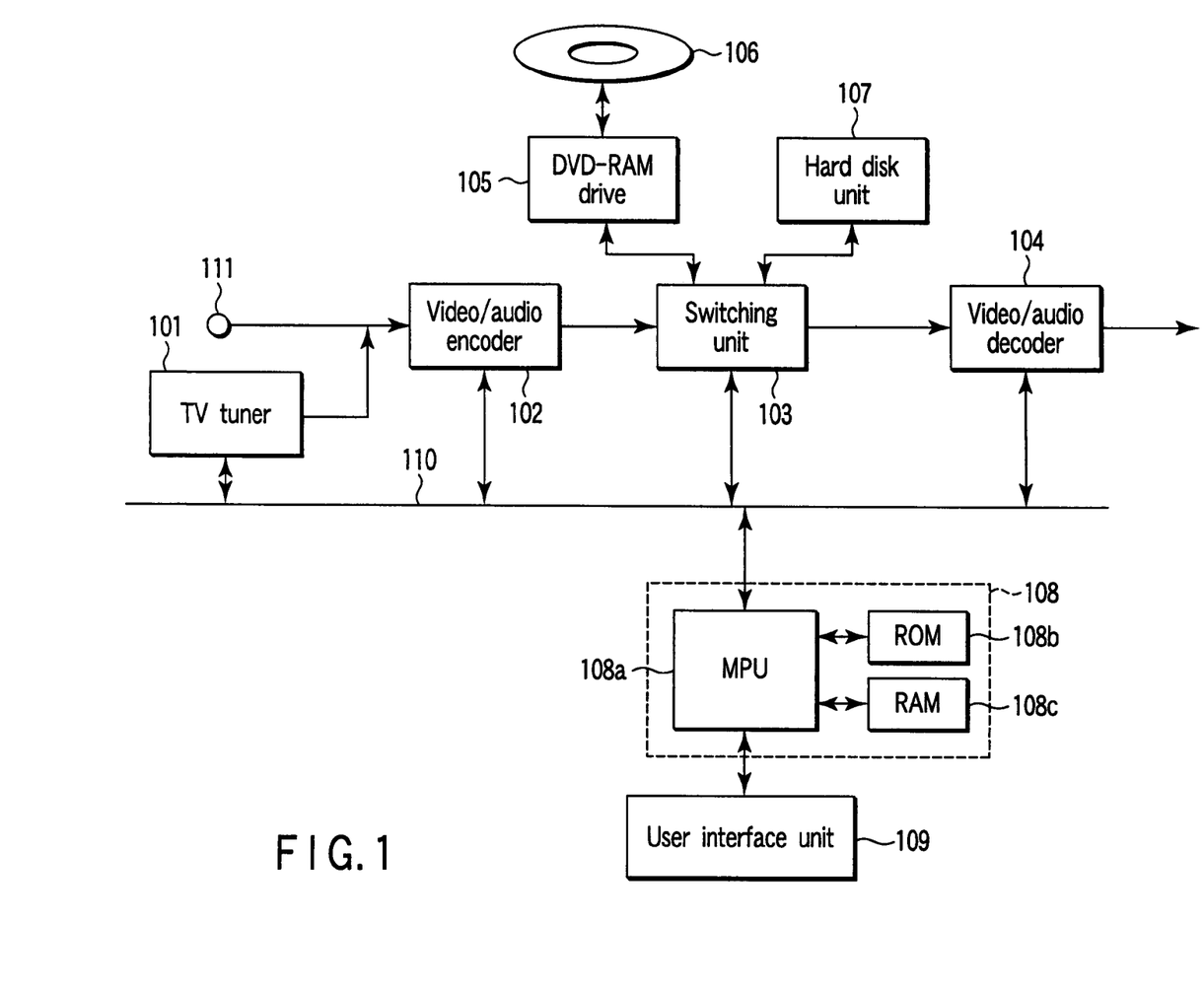
FIG. 1 is a schematic block diagram showing an example of the arrangement of an image recording/reproduction apparatus according to an embodiment of the present invention.

FIG. 1 is a schematic block diagram of an image recording/reproduction apparatus according to an embodiment of the present invention. The image recording/reproduction apparatus shown in FIG. 1 records/reproduces information such as moving image data, still image data, audio data, and the like on/from a built-in hard disk (first information recording medium) and a DVD-RAM disk 106 as a detachable recording medium (second information recording medium).

As shown in FIG. 1, the image recording/reproduction apparatus comprises a TV tuner 101, video/audio encoder 102, switching unit 103, video/audio decoder 104, DVD-RAM drive 105, hard disk unit 107, microcomputer block 108, user interface unit 109, control bus 110, and external input terminal 111.

The recording operation of the image recording/reproduction apparatus will be described first. The TV tuner 101 or external input terminal 111 inputs video and audio signals. The video/audio encoder 102 encodes the input video signal by MPEG-2, and encodes the input audio signal by LPCM (Linear PCM) or Dolby Digital in accordance with a mode selected in advance. Furthermore, the video/audio encoder 102 generates compressed stream data by multiplexing the encoded video and audio signals. The compressed stream data is recorded on a DVD-RAM disk 106 by the DVD-RAM drive 105 or on a hard disk by the hard disk unit 107 via the switching unit 103. That is, the hard disk unit 107 serves as means for recording information on the hard disk as the first information recording medium. Also, the DVD-RAM drive 105 serves as means for recording information on the DVD-RAM disk 106 as the second information recording medium.

The reproduction operation of the image recording/reproduction apparatus will be described below. The DVD-RAM drive 105 reads out data from the DVD-RAM disk 106 or the hard disk unit 107 reads out data from the hard disk. That is, the hard disk unit 107 serves as means for reproducing information from the hard disk as the first information recording medium. Also, the DVD-RAM drive 105 serves as means for reproducing information from the DVD-RAM disk 106 as the second information recording medium. The data read out by the DVD-RAM drive 105 or hard disk unit 107 is supplied to the video/audio decoder 104 via the switching unit 103. The video/audio decoder 104 decodes the supplied data and outputs video and audio signals.

The user interface unit 109 receives key inputs, and displays various kinds of information on a screen. The microcomputer block 108 comprises an MPU 108a, ROM 108b, and RAM 108c, and controls the overall apparatus via the control bus 110. For example, this microcomputer block 108 controls the operations of the hard disk unit 107 and DVD-RAM drive 105. Under this control, the hard disk unit 107 records various kinds of information on the hard disk or deletes various kinds of information recorded on the hard disk. Also, the DVD-RAM drive 105 records various kinds of information on the DVD-RAM disk 106 or deletes various kinds of information recorded on the DVD-RAM disk 106. That is, the microcomputer block 108 executes recording control and delete control.

The DVD-RAM disk 106 records video/audio management information in addition to video/audio data. The hard disk of the hard disk unit 107 records library title information and disk management information in addition to video/audio data and video/audio management information.

Since this image recording/reproduction apparatus comprises the switching unit 103, it can implement various convenient functions. For example, the apparatus can make high-speed dubbing from one of the two recording media (DVD-RAM and built-in hard disk) to the other recording medium via the switching unit, and can record data on one recording medium while reproducing the other recording medium.

Portions associated with library information will be mainly described below. The save format of a library information file will be described first. The library information file contains a library title information file and disk management information file. The library information file is saved on the hard disk unit 107 (the hard disk of the hard disk unit 107). That is, the library title information file and disk management information file are saved on the hard disk unit 107. The contents of these files will be described below.

Figure 2:
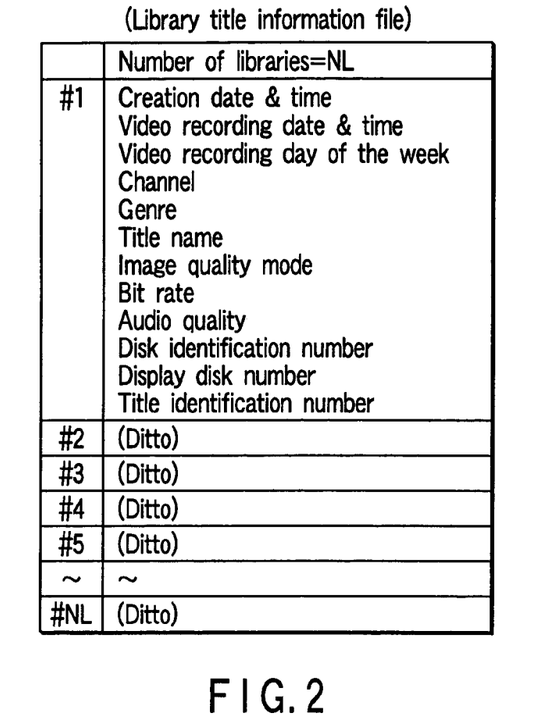
FIG. 2 shows an example of the contents of a library title information file saved on a hard disk.

FIG. 2 shows an example of the contents of the library title information file saved on the hard disk unit 107. In FIG. 2, NL represents the number of pieces of library title information contained in the library title information file. One library title information (#1, #2, or the like) is generated for each information to be recorded, i.e., for each title (each content). One library title information contains information such as a creation date & time, video recording date & time, video recording day of the week, channel, genre, title name, image quality mode (SP, LP, manual, just), bit rate (that of video data), audio quality (LPCM, Dolby Digital, or the like), disk identification number, display disk number, title identification number, and the like.

Figure 3:
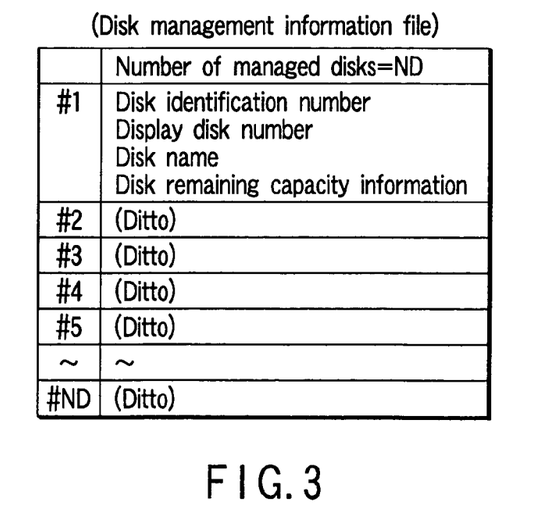
FIG. 3 shows an example of the contents of a disk management information file saved on the hard disk.

FIG. 3 shows an example of the contents of the disk management information file saved on the hard disk unit 107. In FIG. 3, ND represents the number of registered disks. One disk management information (#1, #2, or the like) is generated for each disk. One disk management information contains information such as a disk identification number, display disk number, disk name, disk remaining capacity information, and the like.

The display disk number is a number to be displayed, which is automatically or manually appended upon initializing the disk. For example, "001" indicates disk number 001 without any side designation, "001A" indicates A-side of disk number 001, and "001B" indicates B-side of disk number 001. The disk identification number is a number unique to each disk, and is recorded on a DVD-RAM disk in advance or upon initializing the disk. This number is invisible to the user, and is used to identify the disk. The title identification number is a number appended to uniquely identify a title, and is appended in, e.g., video recording. This title identification number is also saved on the disk side for each title. Note that the title identification may be omitted, and a title may be identified by searching if other pieces of title information match.

As described above, one library title information contains a disk identification number and title identification number to uniquely determine correspondence with a disk and title. One disk management information has a disk identification number to uniquely determine correspondence with a disk.

Note that the hard disk of the hard disk unit 107 is handled as one of disks. That is, the disk management information file contains disk management information corresponding to the hard disk. If a title is recorded on the hard disk, the library title information file includes library title information corresponding to the title recorded on the hard disk, and the disk identification number contained in this library title information indicates the hard disk.

Figure 4:
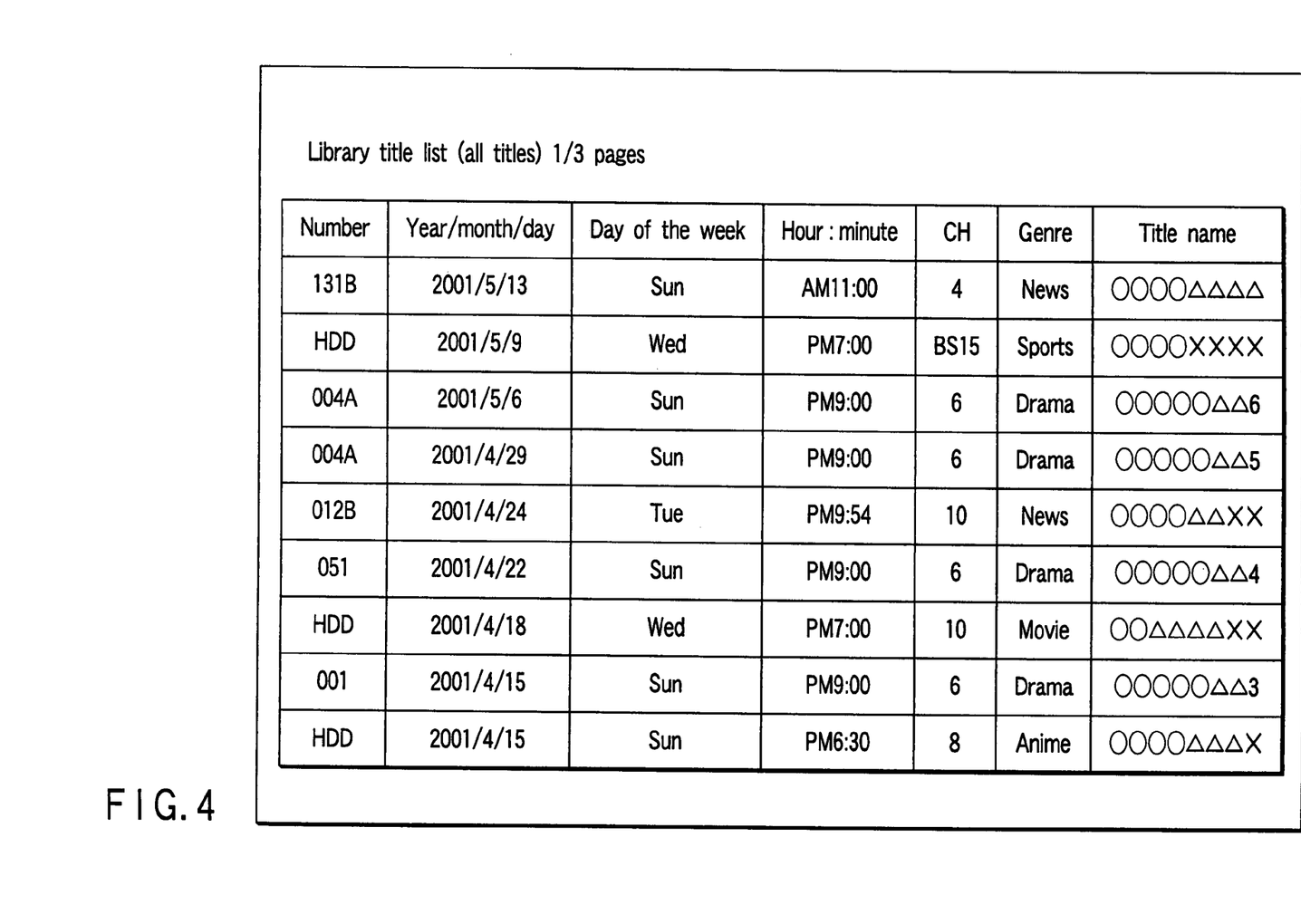
FIG. 4 shows an example of a library display window.

An example of display of library title information will be described below. The user interface unit 109 comprises a library key. When the user has pressed the library key of the user interface unit 109, a library window is displayed. FIG. 4 shows an example of the library display window. The library display window displays a title list. One title display includes information such as a disk number (or disk name), video recording year/month/day, day of the week, hour minute, channel, genre, title name, and the like. On the example of the library display window shown in FIG. 4, respective titles are displayed in descending order of video recording year/month/day. These contents are read out from the library title information file.

Figure 5:
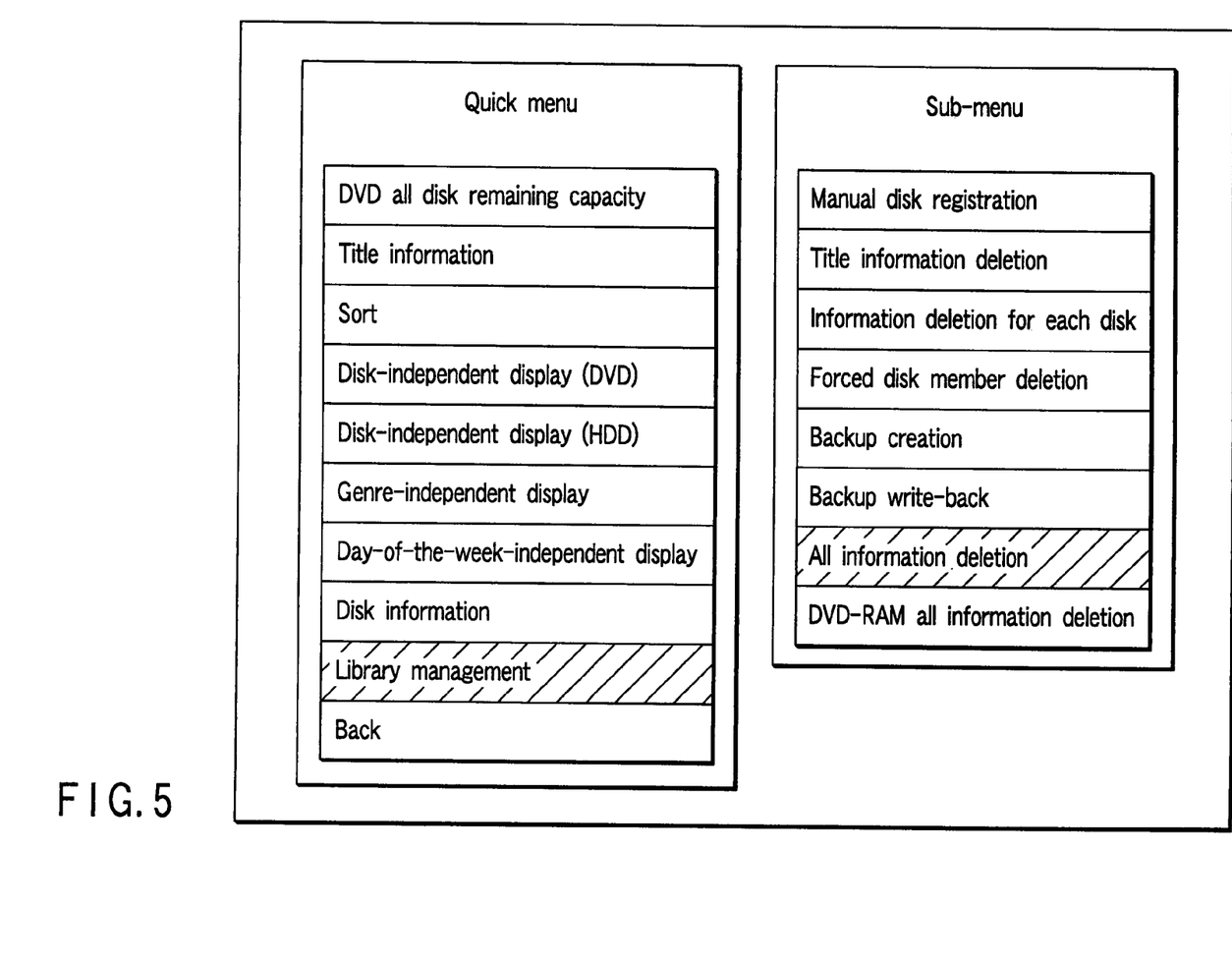
FIG. 5 shows an example of a quick menu during library display, and a sub-menu derived from this quick menu.

Various menus will be explained below. FIG. 5 shows an example of a quick menu during library display, and a sub-menu derived from this quick menu. The user interface unit 109 comprises a quick menu key. When the user has pressed the quick menu key of the user interface unit 109, the quick menu is displayed. The quick menu is a list of currently available operations.

As shown on the left side of FIG. 5, the quick menu displays items such as "DVD all disk remaining capacity", "title information", "sort", "disk-independent display (DVD)", "disk-independent display (HDD)", "genre-independent display", "day-of-the-week-independent display", "disk information", "library management", and the like. When the user has selected the item "library management" (he or she has pressed a select key), a sub-menu shown on the right side of FIG. 5 is displayed.

Respective items of the sub-menu derived from "library management" on the quick menu will be briefly explained below. As shown on the right side of FIG. 5, the sub-menu displays, e.g., items "manual disk registration", "title information deletion", "information deletion for each disk", "forced disk number deletion", "backup creation", "backup write-back", "all information deletion", and "DVD-RAM all information deletion", and the like.

The item "manual disk registration" designates a function of registering disk management information corresponding to one currently loaded, non-registered disk (DVD-RAM) in the disk management information file, and registering library title information corresponding to a title recorded on this disk in the library title information file. If there are a plurality of titles recorded on the disk, a plurality of pieces of library title information corresponding to these titles are recorded in the library title information file.

The item "title information deletion" designates a function of deleting information associated with one currently selected title from the library title information file. That is, this item designates a function of deleting one library title information from the library title information file.

The item "information deletion for each disk" designates a function of deleting information of a disk corresponding to the currently selected disk number from the disk management file, and deleting information associated with all titles contained in that disk from the library title information file. That is, this item designates a function of deleting one disk management information corresponding to one selected disk from the disk management file, and deleting library title information corresponding to a title contained in the selected disk from the library title information file. If there are a plurality of titles recorded on the disk, a plurality of pieces of library title information corresponding to these titles are deleted from the library title information file.

The item "forced disk number deletion" designates a function of deleting information of a disk corresponding to the designated disk number from the disk management file, and deleting information all titles contained in that disk from the library title information file. That is, this item designates a function of deleting one disk management information corresponding to one designated disk number from the disk management file, and deleting library title information corresponding to a title recorded on the selected disk from the library title information file. If there are a plurality of titles recorded on the disk, a plurality of pieces of library title information corresponding to these titles are deleted from the library title information file.

The item "backup creation" designates a function of backing up the library title information file and disk management information file from the hard disk onto a DVD-RAM.

The item "backup write-back" designates a function of writing back the backup files of the library title information file and disk management information file created on the DVD-RAM by the backup creation function onto the hard disk.

The functions of the items "all information deletion" and "DVD-RAM all information deletion" will be described later.

A management setup menu will be described below. The user interface unit 109 comprises an initial setup key. When the user has pressed the initial setup key of the user interface unit 109, the management setup menu is displayed. The management setup menu displays an item "management setup". When the user has selected the item "management setup", items "HDD all title deletion", "HDD initialization", and "DVD-RAM physical format" are selectable.

Subsequently, the HDD all title deletion function will be described below. When the user has selected the item "HDD all title deletion", all titles recorded on the hard disk are deleted. This HDD all title deletion function is suited to a case wherein the hard disk is to be initialized but the library information file is to be left unerased. The image recording/reproduction apparatus of the present invention has a simultaneous deletion function capable of deleting a plurality of titles together. However, since the HDD all title deletion function deletes files, it can delete them at very higher speed than the simultaneous deletion function.

As described above, the HDD all title deletion function can be executed from the management setup menu since it is not a library deletion function. The HDD all title deletion function is processed as a function based on disk initialization, and skips a check process of title protection which indicates whether or not a given title is set with change protection. However, a warning message is displayed before execution.

Upon execution of the HDD all title deletion function, a plurality of pieces of library title information corresponding to all titles recorded on the hard disk, of those contained in the library title information file recorded on the hard disk are also deleted. At this time, a plurality of pieces of library title information corresponding to all titles recorded on DVD-RAMs of those contained in the library title information file recorded on the hard disk are not deleted. Since all titles recorded on the hard disk are deleted, a plurality of pieces of library title information corresponding to the deleted titles are no longer required. In this way, since required processes upon execution of the HDD all title deletion function are automatically executed, the free space of the hard disk can be efficiently assured.

Figure 6:
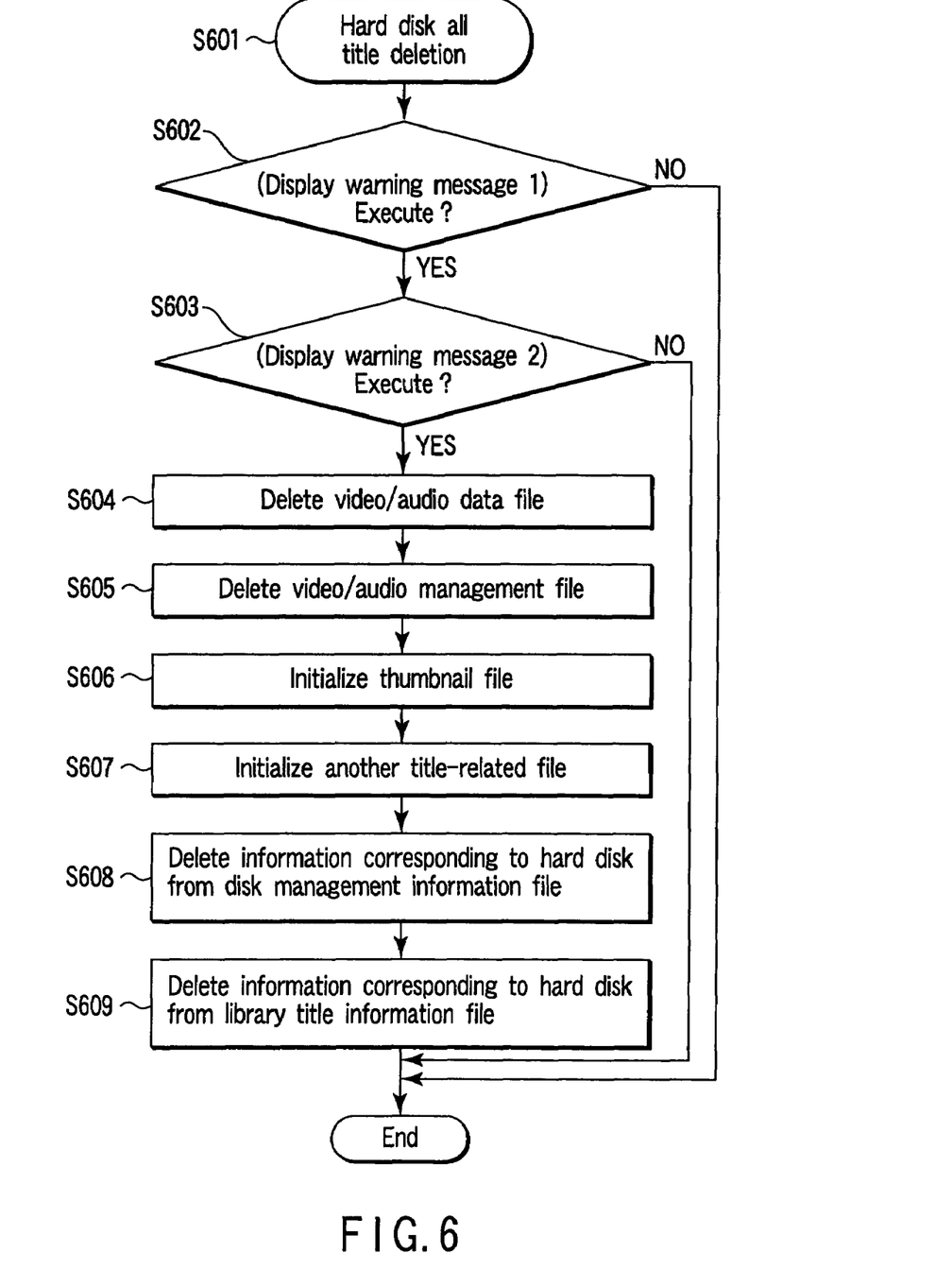
FIG. 6 is a flow chart showing an example of the operation of a hard disk all title deletion function.

FIG. 6 is a flow chart showing an example of the operation of the HDD all title deletion function. As shown in FIG. 6, when the HDD all title deletion function is designated (S601), warning message 1 is displayed to prompt the user to select either "YES" or "NO" (S602). If "NO" is selected (S602, NO), the flow ends. If "YES" is selected (S602, YES), another warning message 2 is displayed to prompt the user to select either "YES" or "NO" (S603). If "NO" is selected (S603, NO), the flow ends. If "YES" is selected (S603, YES), video/audio data files on the hard disk are deleted (S604). Subsequently, video/audio management files on the hard disk are deleted (S605), and thumbnail files (S606) and other title-related files (S607) are initialized. Furthermore, hard disk-related information is deleted from the disk number management file on the hard disk (S608), and hard disk-related information is also deleted from the library title information file on the hard disk (S609).

Note that warning message 1 displayed in step S602 is, for example, "All titles will be deleted even if title protection is set. No library is deleted. OK?". Also, warning message 2 displayed in step S603 is "All titles will be deleted. OK?".

This HDD all title deletion function neither deletes nor changes a programmed video recording history file and other files which are not related to title information on the hard disk.

As for DVD-RAMs, since an all title deletion function is equivalent to a disk initialization function, no DVD-RAM all title deletion function is required from the beginning. Hence, the all title deletion function is effective only for the hard disk.

In order to obtain the same result as that of this all title deletion function using a conventional library function, the following methods may be used, but they are very troublesome.

(Method 1)
The library title information file is backed up by the "backup creation" function.
The hard disk is initialized by the "HDD initialization" function.
The library title information file is written back by the "backup write-back" function.
A plurality of pieces of library title information corresponding to all titles recorded on the hard disk are deleted by the "information deletion for each disk" function.

(Method 2)
The hard disk is initialized by the "HDD initialization" function.
The contents of all possessed DVD-RAMs are manually registered one by one by the "manual disk registration" function.

According to an aspect of the present invention, only the contents of all titles recorded on the HDD can be deleted by a single operation without influencing the library title information file. In addition, none of a re-registration process of library title information, a backup & write-back process of the library title information file, and the like are required.

The all library information deletion function will be described below. The all library information deletion function to be described below is suited to a case wherein the user wants to, e.g., re-organize the library title information file. For example, this function is applied when the user wants to re-define number assignment rules upon assigning the display disk numbers. That is, the user wants to assign numbers 100 to 199 to music, 200 to 299 to drama, 300 to 399 to sports, and so forth.

The all library information deletion function initializes only the library title information file and disk management information without erasing the contents (titles) recorded on the hard disk. As shown in FIG. 5, the user can select the following two modes from the sub-menu.
"all information deletion"
"DVD-RAM all information deletion"

When the user has selected the item "all information deletion", information of both a DVD-RAM and the hard disk is initialized. On the other hand, when the user has selected the item "DVD-RAM all information deletion", information of only a DVD-RAM is initialized.

Normally, the user may use "DVD-RAM all information deletion". In case of "all information deletion", since a plurality of pieces of library title information corresponding to titles recorded on the hard disk are deleted, a quick display effect is expected.

Figure 7:
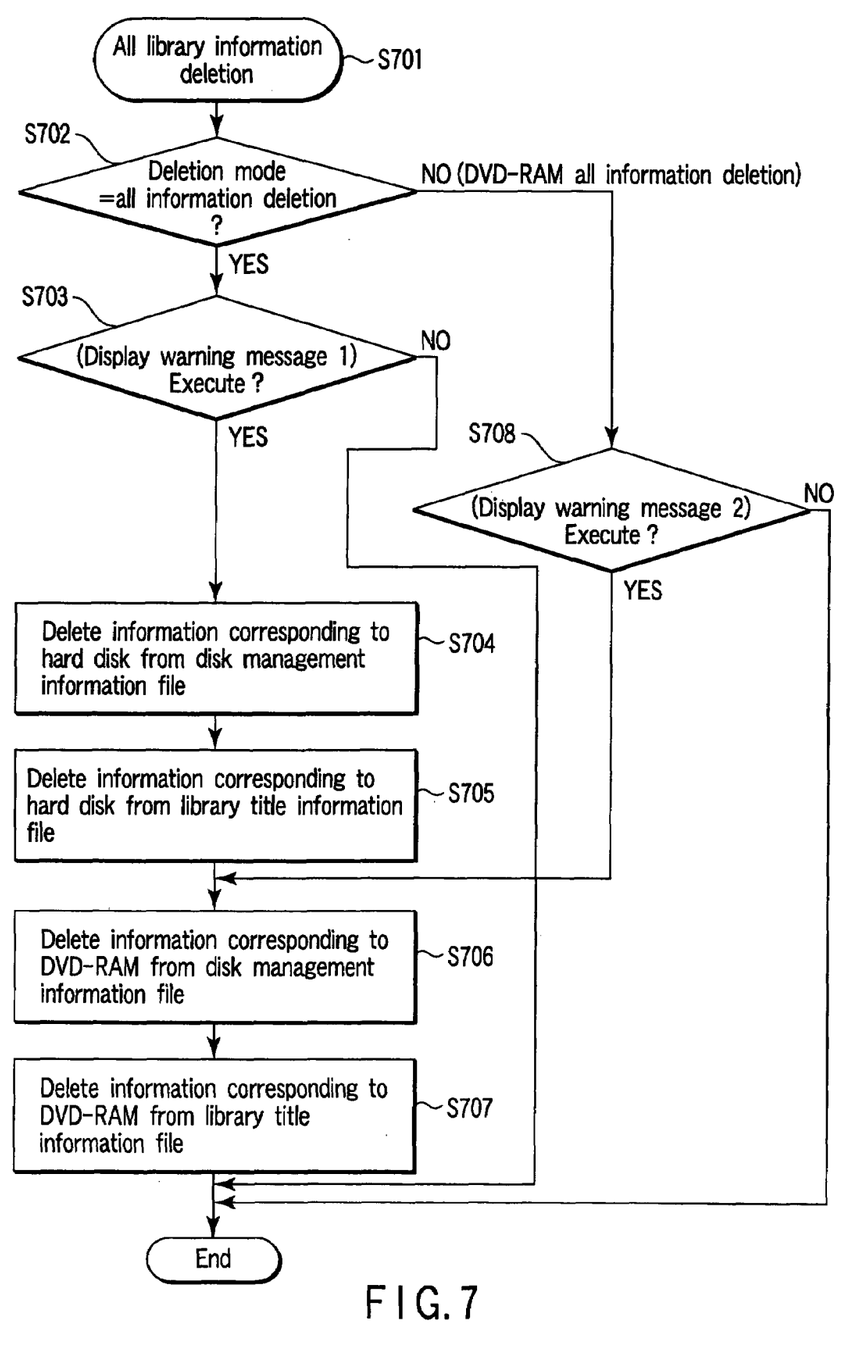
FIG. 7 is a flow chart showing an example of the operation of an all library information deletion function.

FIG. 7 is a flow chart showing the operation of the all library information deletion function. As show in FIG. 7, the all library information deletion function is designated (S701), and its process starts. That is, one of the items "all information deletion" and "DVD-RAM all information deletion" is selected (S701) to start the process.

If the user has selected the item "DVD-RAM all information deletion" (S702, NO), warning message 2 is displayed to prompt the user to select either "YES" or "NO" (S708). If "NO" is selected (S708, NO), the flow ends. If "YES" is selected (S708, YES), all pieces of information corresponding to all DVD-RAMs contained in the disk management information file are deleted (S706), and all pieces of information corresponding to all DVD-RAMs contained in the library title information file are deleted (S707).

If the user has selected the item "all information deletion" (S702, YES), warning message 1 is displayed to prompt the user to select either "YES" or "NO" (S703). If "NO" is selected (S703, NO), the flow ends. If "YES" is selected (S703, YES), all pieces of information corresponding to the hard disk contained in the disk management information file are deleted (S704), and all pieces of information corresponding to the hard disk contained in the library title information file are deleted (S705). Furthermore, all pieces of information corresponding to all DVD-RAMs contained in the disk management information file are deleted (S706), and all pieces of information corresponding to all DVD-RAMs contained in the library title information file are deleted (S707).

Note that warning message 1 displayed in step S703 is, for example, "all pieces of library information will be deleted. OK?". On the other hand, warning message 2 displayed in step S708 is, for example, "all pieces of library information of DVD-RAMs will be deleted. OK?".

In order to obtain the same result as that of the all library information deletion function using a conventional library function, the following methods may be used, but they are very troublesome.

(Method 1)
The "forced disk number deletion" (or "information deletion for each disk") function is repeated in correspondence with the number of possessed DVD-RAMs to delete all disk numbers.

(Method 2)
Required titles on the hard disk are temporarily dubbed onto a DVD-RAM or DVD-RAMs.
The hard disk is initialized by the "HDD initialization" function.
The titles dubbed on the DVD-RAM or DVD-RAMs are re-dubbed onto the hard disk.

According to an aspect of the present invention, only the library title information file can be initialized by a single operation without influencing the contents of all titles, and library title information need not be deleted for each disk or title.

As described above, according to the present invention, initialization of only the library title information file or initialization of only image information (titles) can be easily implemented. Hence, a large number of pieces of library title information can be efficiently organized and managed, thus further improving convenience of the library function.

Practical effects will be summarized below.

(1) The image recording/reproduction apparatus of the present invention can independently execute all deletion of library title information stored in the hard disk, and that of image information (titles) stored in the hard disk. In this way, the user need not delete or register library title information for each title or disk, and can efficiently organize and manage a large number of pieces of library title information.

(2) The image recording/reproduction apparatus of the present invention can independently execute all deletion of image information (titles) stored in the hard disk without executing all deletion of library title information stored in the hard disk. In this way, the user can initialize only image information stored in the hard disk and can organize the hard disk without re-registering library title information. Furthermore, the image recording/reproduction apparatus of the present invention automatically deletes library title information which is no longer required, i.e., library title information corresponding to the image information stored in the hard disk. In this manner, the user need not manually delete library title information corresponding to the deleted image information.

(3) The image recording/reproduction apparatus of the present invention can independently execute all deletion of library title information stored in the hard disk without executing all deletion of image information stored in the hard disk. As a result, the user can efficiently initialize and re-organize a large number of pieces of library title information without deleting library title information for each title or disk. Furthermore, the image recording/reproduction apparatus of the present invention comprises a mode of deleting all pieces of library title information corresponding to image information recorded on both DVD-RAMs and the hard disk, and a mode of deleting all pieces of library title information corresponding to image information recorded on DVD-RAMs. With these modes, the user can selectively execute initialization of all pieces of library title information and that of only library title information corresponding to image information recorded on DVD-RAMs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording/reproduction apparatus comprising:
   a first recording/reproduction unit configured to record information on a built-in first information recording medium, reproduce information recorded on the first information recording medium, and delete information recorded on the first information recording medium;
   a second recording/reproduction unit configured to record information on a detachable second information recording medium, and reproduce information recorded on the second information recording medium;
   a recording control unit configured to control the first recording/reproduction unit to record a library information file, which contains a plurality of pieces of library information corresponding to a plurality of pieces of contents information recorded on the first and second information recording media, on the first information recording medium; and
   a deletion control unit configured to execute an all deletion mode for controlling the first recording/reproduction unit to delete all pieces of library information contained in the library information file recorded on the first information recording medium,
   wherein the deletion control unit deletes all pieces of contents information recorded on the first information recording medium and second information recording medium by selecting a first contents deletion mode after execution of the all deletion mode, and deletes all pieces of contents information recorded on the second information recording medium by selecting a second contents deletion mode when executing the all deletion mode.

2. An apparatus according to claim 1, wherein the deletion control unit executes a partial deletion mode for controlling the first recording/reproduction unit to delete only library information corresponding to contents information recorded on the second information recording medium of the plurality of library information contained in the library information file recorded on the first information recording medium, independently of execution of the all deletion mode.

* * * * *